United States Patent Office 3,075,980
Patented Jan. 29, 1963

3,075,980
PROCESS FOR THE PRODUCTION OF 2,4,5,6,-TETRACHLOROPYRIMIDINE
Jakob Benz, Munchenstein, Basel-land, Switzerland, assignor to Sandoz Ltd., Basel, Switzerland
No Drawing. Filed May 3, 1960, Ser. No. 26,411
Claims priority, application Switzerland May 6, 1959
1 Claim. (Cl. 260—251)

This invention relates to a process for the production of 2,4,5,6-tetrachloropyrimidine, which consists in treating 5-chlorobarbituric acid with chlorides of phosphorus, e.g. phosphorus trichloride, phosphorus pentachloride or, preferably phosphorus oxychloride, if desired in presence of tertiary amines, e.g. dimethylaniline or diethylaniline.

The chlorination of 5-chlorobarbituric acid is carried out preferably by heating it in the chloride of phosphorus—if necessary under pressure at temperatures about 150° C.—or in a mixture of phosphorus oxychloride and a tertiary amine at boiling temperature. The further preparation of the crude product obtained may be carried out, for example by extracting with ether, evaporating the ether and distilling off the ether residue or by dissolving and recrystallization.

The major advantage of this process as compared with the previously known methods (J. Am. Chem. Soc. 72, 4271 (1950)), in which barbituric acid is reacted with a substantial excess of phosphorus pentachloride and/or phosphorus oxychloride, is the increase in the yield to 70–75%, calculated on the amount of barbituric acid employed. Moreover, the present process yields a crude product whose degree of purity is sufficiently high for most uses.

|  | Approx. percent |
|---|---|
| Yield of 5-chlorobarbituric acid | 88 |
| Yield of 2,4,5,6-tetrachloropyrimidine | 85 |
| Total yield calculated on barbituric acid | 72 |

A further known process for the preparation of 2,4,5,6-tetrachloropyrimidine, starting from alloxane, is economically uninteresting.

In the following examples the parts and percentages are by weight and the temperatures in degrees centigrade.

*Example 1*

162.5 parts of 5-chlorobarbituric acid are entered in a mixture of 450 parts of phosphorus oxychloride and 60 parts of dimethylaniline. The reaction mixture is heated to the boil in 30 minutes and maintained at the boil for 10 hours, during which time the 5-chlorobarbituric acid goes slowly into solution. The mass is allowed to cool to 50° and is run into about 1300 parts of ice-water, care being taken that the temperature does not exceed 5°. After stirring for 2 hours the product is filtered off and the press cake washed with ice-water.

The crude product whose degree of purity is sufficiently high for most technical uses can be further purified in the following manner: It is taken up in 1000 parts of diethyl ether, the ether solution washed with water and subsequently dried with anhydrous sodium sulfate. On evaporation of the ether the residue is fractionated with vacuum. The 2,4,5,6-tetrachloropyrimidine distills at 11 mm. mercury and 108–109°. It congeals in the receiver in the form of white crystals, the melting point of which lies at 67–68°. The amount of phosphorus oxychloride employed in the present example is in excess over the theoretical amount; this excess serves as solvent to dissolve the formed reaction products.

The reaction can also be carried out in a larger amount of phosphorus oxychloride or phosphorus oxychloride plus dimethylaniline but this does not bring about an increased yield and the excess over the amount used in the present example can be distilled off from the reaction mixture and re-employed in a next batch.

*Example 2*

326 parts of finely ground 5-chlorobarbituric acid are entered slowly into a mixture of 880 parts of phosphorus oxychloride and 120 parts of diethylaniline. The mixture is heated to the boil in 30 minutes with constant stirring and is maintained at the boil for 15 hours. In the course of the reaction the temperature rises from about 105° to around 140°. The brownish colored reaction mass is allowed to cool to about 100° and then run onto ice. The temperature of the ice-mixture must not be allowed to exceed 5°. The precipitated 2,4,5,6-tetrachloropyrimidine, which is already of a high degree of purity, is filtered off at 0–5° and washed with ice-water.

After elimination of the adsorbed water the crude product can be further purified by vacuum distillation. The colorless product is obtained in very good yield with a melting point at 66–68° (uncorrected).

5-chlorobarbituric acid can be produced, for example, by dissolving 420 parts of barbituric acid in 3500 parts of water at 70° and adding 240 parts of chlorine in the course of 2–3 hours at 65–68° with stirring. Towards the end of the chlorination process the 5-chlorobarbituric acid precipitates in the form of needles. The mass is allowed to cool to 20–21° in 2 hours with stirring. The 5-chlorobarbituric acid is filtered off, washed with a little ice-water and dried with vacuum at 90° to constant weight.

Having thus disclosed the invention, what I claim is:
A process for the production of 2,4,5,6-tetrachloropyrimidine, which comprises
 (a) heating a mixture of 5-chloro-barbituric acid, phosphorus oxychloride and a tertiary amine selected from the group consisting of dimethylaniline and diethylaniline to boiling until the ensuing reaction is substantially complete;
 (b) cooling the reaction mass and then diluting with water while maintaining the resultant mixture, in which 2,4,5,6-tetrachloropyrimidine precipitates, at a temperature not exceeding 5° C.; and
 (c) recovering the precipitated 2,4,5,6-tetrachloropyrimidine.

References Cited in the file of this patent

Emery: Berichte, volume 34 (1901), pages 4178–80.
Uber et al.: J. Amer. Chem. Soc., volume 63 (1941), pages 137–40.
King et al.: J. Chem. Soc. (London) 1947, pages 1247–8.
Langerman et al.: J. Amer. Chem. Soc., volume 73 (1951), pages 3011–2.
Smith et al.: J. Org. Chem., volume 20 (1955), pages 829–38 (pages 829–30 relied on).